(12) United States Patent
Zakharov et al.

(10) Patent No.: US 10,726,203 B2
(45) Date of Patent: Jul. 28, 2020

(54) SUPPORT AUTOMATION USING MACHINE LEARNING

(71) Applicant: KYOCERA Document Solutions, Inc., Chuo-Ku Osaka (JP)

(72) Inventors: Oleg Y. Zakharov, Walnut Creek, CA (US); Matthew Yoshio Morikawa, Concord, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 107 days.

(21) Appl. No.: 16/176,284

(22) Filed: Oct. 31, 2018

(65) Prior Publication Data

US 2020/0134012 A1    Apr. 30, 2020

(51) Int. Cl.
| | |
|---|---|
| *G06F 11/00* | (2006.01) |
| *G06F 40/20* | (2020.01) |
| *G06F 3/00* | (2006.01) |
| *G06F 40/205* | (2020.01) |
| *G06N 20/00* | (2019.01) |
| *G06F 40/30* | (2020.01) |
| *G06F 40/284* | (2020.01) |

(52) U.S. Cl.
CPC .......... *G06F 40/205* (2020.01); *G06F 40/284* (2020.01); *G06F 40/30* (2020.01); *G06N 20/00* (2019.01)

(58) Field of Classification Search
CPC ............. G06F 3/00; G06F 11/00; G06F 40/20
See application file for complete search history.

(56) References Cited

U.S. PATENT DOCUMENTS

| 9,715,496 | B1 | 7/2017 | Sapoznik | |
| 2001/0049688 | A1* | 12/2001 | Fratkina | ............... G06N 5/042 |
| 2003/0083922 | A1 | 5/2003 | Reed | |
| 2006/0112127 | A1 | 5/2006 | Krause | |
| 2007/0094217 | A1 | 4/2007 | Ronnewinkel | |

(Continued)

OTHER PUBLICATIONS https://www.groundai.com/project/class-vectors-embedding-representation-of-document-classes/.

(Continued)

*Primary Examiner* — Shreyans A Patel
(74) *Attorney, Agent, or Firm* — The Webostad Firm, a PC

(57) ABSTRACT

System(s)/method(s) relate to machine learning to automatically respond for troubleshooting a device. A programmed computer system obtains a training dataset from at least one database including historical customer complaint records and maintenance service records with resolution codes. The training dataset is parsed by a natural language extraction engine to extract data including extracting keyword data from the historical customer complaint records. The extracted data is grouped into bags-of-words with a natural language association engine. The bags-of-words are mapped to one or more of the resolution codes with an SVM to provide corresponding mapping vectors. A current customer complaint record is received and information therein is parsed to provide a request bag-of-words. One or more of the mapping vectors having one or more most likely fits to the request bag-of-words is determined. One or more of the resolution codes associated with the one or more of the mapping vectors is provided.

20 Claims, 10 Drawing Sheets

(56) References Cited

U.S. PATENT DOCUMENTS

| | | | | |
|---|---|---|---|---|
| 2007/0263255 | A1* | 11/2007 | Johnson | G03G 15/5079 |
| | | | | 358/2.1 |
| 2011/0185220 | A1* | 7/2011 | Foley | G03G 15/5079 |
| | | | | 714/2 |
| 2013/0262082 | A1* | 10/2013 | McKeeman | G06F 40/20 |
| | | | | 704/9 |
| 2013/0321842 | A1* | 12/2013 | Yamamoto | H04N 1/00087 |
| | | | | 358/1.13 |
| 2014/0074457 | A1* | 3/2014 | Masuda | G06F 40/274 |
| | | | | 704/9 |
| 2016/0342911 | A1 | 11/2016 | Kannan | |
| 2017/0140280 | A1 | 5/2017 | Ajmera | |
| 2019/0306327 | A1* | 10/2019 | Matysiak | G06F 3/1288 |

OTHER PUBLICATIONS https://patents.google.com/patent/US20160342911A1/en?q="support+vector"&q="customer+support"&num=100.
https://teachermanalex.wordpress.com/2018/05/02/what-are-vectors-in-machine-learning/.
https://medium.com/@haydar_ai/learning-data-science-day-19-naive-bayes-3d5d8b93f8e9.
http://ataspinar.com/2015/11/16/text-classification-and-sentiment-analysis/.
https://datascience.stackexchange.com/questions/15784/how-to-handle-negative-words-in-word2vec.
CS229 Lecture Notes by Andrew Ng, Part V, pp. 1-25: http://cs229.stanford.edu/notes/cs229-notes1.pdf.

* cited by examiner

| Device Model 401 | Service Description 402 | Resolution Code 403 | Customer Name 404 | Technician Name 405 | Request Number 406 | Service Date 407 |
|---|---|---|---|---|---|---|

SUPPORT AUTOMATION USING MACHINE LEARNING

TECHNICAL FIELD

The following description relates to support automation using machine learning. More particularly, the following description relates to automatically responding for troubleshooting a printing device.

BACKGROUND

Manufactures of devices, including electronic devices, are increasingly looking for ways to provide a better customer support experience. Along those lines, enhancing speed and/or accuracy in handling customer support issues would be desirable.

SUMMARY

Computer-implemented technology relates generally to support automation using machine learning to automatically respond for troubleshooting a device.

A computer-implemented method relates generally to automatically responding for troubleshooting a printing device. In such a method, a programmed computer system obtains a training dataset. The training dataset is obtained from at least one database including a plurality of data sources. The plurality of data sources include a first data source including historical customer complaint records and a second data source including maintenance service records. The maintenance service records include resolution codes. The training dataset is parsed by a natural language extraction engine of the programmed computer system to provide extracted data. The parsing of the training dataset includes extracting keyword data from the historical customer complaint records. The extracted data is grouped into bags-of-words with a natural language association engine. The bags-of-words are mapped to one or more of the resolution codes with a support vector machine to provide corresponding mapping vectors. A current customer complaint record is received. Information in the current customer complaint record is parsed to provide a request bag-of-words. One or more of the mapping vectors having one or more most likely fits to the request bag-of-words is determined. One or more of the resolution codes associated with the one or more of the mapping vectors is provided.

A computer-implemented system relates generally to automatically responding for troubleshooting a printing device. In such system, memories are configured to store program code and at least one database. At least one processor of a processor system is configured in response to the program code to execute machine executable instructions to obtain the at least one database as a training dataset. The training dataset obtained from the at least one database includes a plurality of data sources. The plurality of data sources include a first data source having historical customer complaint records and a second data source having maintenance service records. The maintenance service records include resolution codes. The at least one processor of the processor system is configured in response to the program code to execute the machine executable instructions to: parse the training dataset by a natural language extraction engine of the processor system to provide extracted data including extracting keyword data from the historical customer complaint records; group the extracted data into bags-of-words with a natural language association engine of the processor system; map the bags-of-words to one or more of the resolution codes with a support vector machine of the processor system to provide corresponding mapping vectors; receive a current customer complaint record; parse information in the current customer complaint record to provide a request bag-of-words; determine one or more of the mapping vectors having one or more most likely fits to the request bag-of-words; and provide one or more of the resolution codes associated with the one or more of the mapping vectors.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a pseudo code listing depicting an example of bags-of-words.

FIG. 1-3 is a flow diagram depicting a continuation of the example of customer issue process flow 100 of FIG. 1-1.

FIG. 1-4 is a pseudo code listing depicting an example of resolution codes and associating or coding of customer records and resolutions codes.

FIG. 2-1 is a block-flow diagram depicting an exemplary computer-implemented mapping vector generation process using a programmed computing system for automatically responding to a customer request for troubleshooting a device.

FIG. 2-2 is a flow diagram depicting examples of operations for a parsing operation of FIG. 2-1.

FIG. 2-3 is a flow diagram depicting examples of operations for an extracting operation of FIG. 2-2.

FIG. 3 is the block-flow diagram of FIG. 2-1 further depicting an example of a customer request flow for automatically responding to a customer request for troubleshooting a device.

FIG. 4 is a block diagram depicting an example of fields of a service record.

FIG. 5 is a block diagram depicting an example of a programmed computer system.

DETAILED DESCRIPTION

Figure 1:
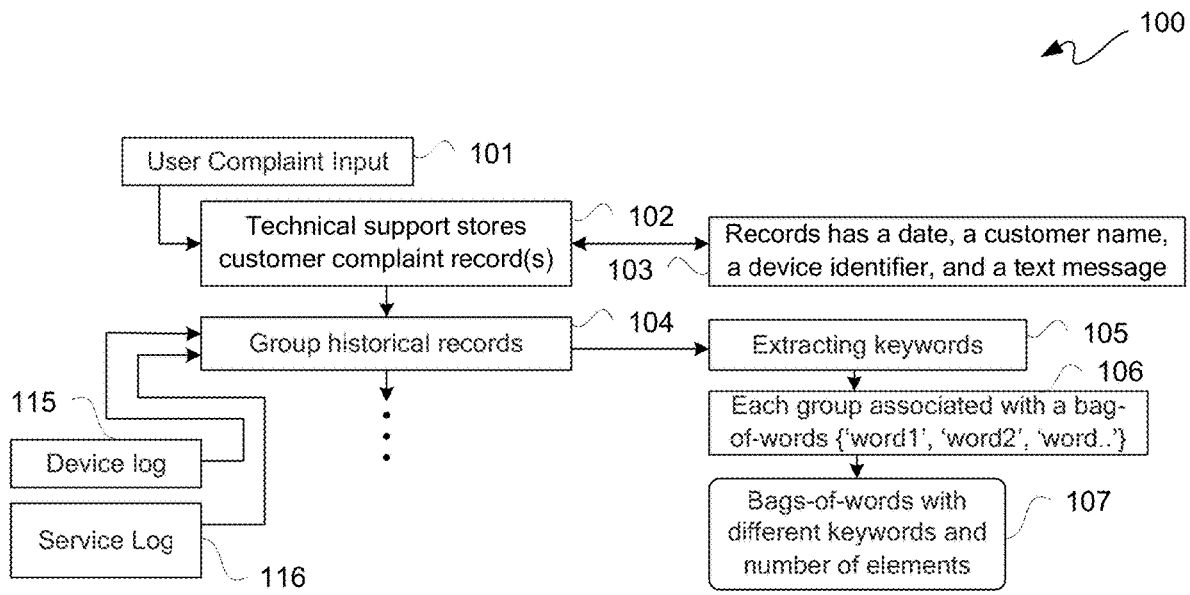
FIG. 1-1 is a flow diagram depicting an example of a customer issue process flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

Customer support operations may include solving issues associated with customer equipment, including on-premises customer equipment. In order to enhance speed and accuracy of solving such issues, technology that facilitates an automatic processing of input information regarding such issues is described below in additional detail. Customer support may include a range of customer services to assist customers in making cost effective and correct use of a product such as a printing device. Customer service may include assistance in planning, installation, training, troubleshooting, maintenance, upgrading, and/or disposal of a product.

Customer support may be structured with several level or tiers. For example, "Tier-1" may be a basic level of customer support. A customer support for providing Tier-1 support may include identification of a customer's needs and providing tips or timing guidelines (such as, when to visit customer sites) on how to manage a problem. Tier-1 support may include providing 24-hour service and may be outsourced to a third party. When a Tier-1 support employee is not able to resolve an issue, such employee may classify such problem and pass it on to an appropriate Tier-2 support employee.

Tier-2 support may involve more technical knowledge than Tier-1 support, and Tier-2 support may be staffed by technicians or other specialists who have troubleshooting capabilities, including technical capabilities, beyond Tier-1 support personnel. If an issue is a known existing problem, a Tier-2 support specialist may find out if there is a solution or a workaround in a support database. A Tier-2 specialist may transform customer complaints into database queries, based on their expertise and skill, in order to find corresponding solutions in such support database. An aspect described below in additional detail automates a database query into a support database to enhance customer satisfaction by speeding up Tier-2 support.

Tier-3 support may include a person who has specialized skills over and above a Tier-2 specialist. Tier-3 support may be provided by specialists involved in product development. Tier-3 support may deal with complex issues. To solve Tier-3 problems, Tier-3 support personnel may collect data from Tier-1 and Tier-2 personnel and/or databases. An aspect described below in additional detail addresses an issue of collecting data for a complex problem.

As described below in additional detail, an automation of converting customer complaints into corresponding known solutions, reduces processing time by Tier-2 and/or Tier-3 specialists on problems. As described below in additional detail, a knowledge database may include historical records collected from Tier-2 and/or Tier-3 specialists about solutions of different problems. Each of such records in a solution database may be marked by a resolution code for a final solution to a maintenance or service issue that can be mapped to one or more different symptoms by a classification process.

FIG. 1-1 is a flow diagram depicting an example of a customer issue process flow 100. At operation 101, a customer or other user complaint may be input. For purposes of clarity by way of example and not limitation, it shall be assumed that such input is from a customer about a printing device, such as a printer for example. However, the following description is not limited to the printing industry and/or printing devices, but may be used in other industries and/or for other devices in which customer support for solving device issues is used.

A user complaint or other request input at operation 101 may be obtained from a customer email, a customer text message, a customer response to a chatbot converted to text, input by customer service personnel handling customer complaint via phone, customer online input via web service, and/or other form of input in which text associated with such user complaint input may be obtained. For purposes of clarity by way of example and not limitation, it shall be assumed such user complaint input is obtained from a text or email message. Such messages may include customer described symptoms of a problem.

At operation 102, customer records 103 are stored. Customer records 103 may include customer complaint records stored by a technical support function, such as provided by a technical support computer agent or a team of human agents. However, customer records 103 may additionally include information about a customer's behavior, preferences, and/or personality with or without reference to a printing device. For purposes of clarity by way of non-limiting example, customer records 103 are assumed to be customer complaint records. In the printing industry, each customer complaint record 103 may include a date, a customer name, a device identifier, and a customer text message.

At operation 104, records 103 of customer complaints, such as historical customer complaint records for example, may be grouped. This grouping may include at operation 105 extracting keywords from text messages or email messages associated with historical customer complaint records 103 or other requests, and at operation 106 associating each grouping of keywords with a "bag-of-words". Accordingly, operation 104 may result in "bags-of-words" 107 with different sets of elements, namely, keywords, with same or different numbers of elements therein.

Extracting keywords from symptom descriptions may be used as an input for a machine learning algorithm. Extraction of keywords may include parsing for word groupings and identifying keywords. Parsing can be done through multiple known algorithms, such as for example Neural Network dependency parsing or Compositional Vector Grammar Parsing. Parsing may be used to identify negative word modifiers, such as for example "none", "not", and "no" and word modifiers such as for example "very", "little", and "much". After parsing for word groupings, remaining text may be parsed to identify keywords. This parsing for word groupings can include removing known words that provide little value, commonly referred to as "stopwords". Optionally, a list of known words can be used instead of parsing, and only such known words on such list are kept for processing.

Other inputs for grouping of historical records at operation 104 for building bags-of-words 107 may be from a device log 115 from a printing device and/or a maintenance/service log 116 from or for a printing device. Along those lines, some printing devices may have a history involving multiple service visits, such as to resolve image quality issues for example, which may be flagged for feature extraction.

By using text classification described below in additional detail, symptoms of a problem may be extracted from a customer complaint as one or more keywords. For purposes of clarity by way of non-limiting example, suppose a printing device has an image quality issue, and a user submitted a complaint about this problem. A symptom description in a text message may provide some information about this problem. However, in some instances, a text message may not provide enough details, so after initial processing of a customer's complaint, additional information can be requested from a customer at operation 101 or may be obtained from a history of maintenance records for such customer and/or such printing device at operation 101.

Figures 1, 2:
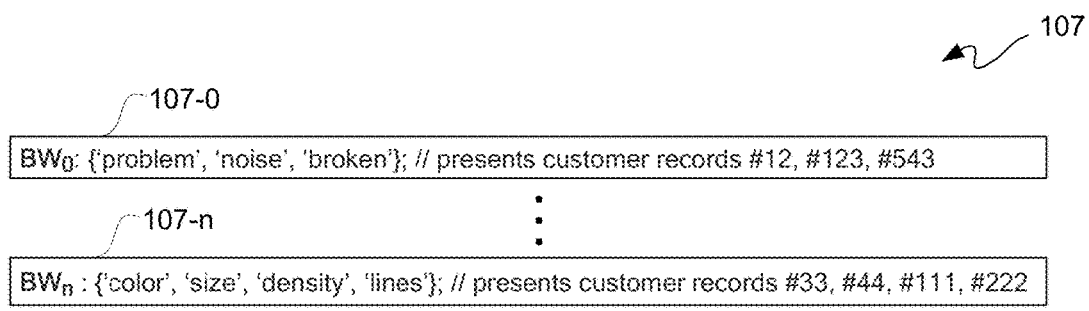

FIG. 1-2 is a pseudo code listing depicting an example of bags-of-words 107. In this example, an initial bag-of-words ($BW_0$) 107-0 of bags-of-words 107 has a set of keywords, which in this example are problem, noise and broken. As indicated in the remarks for $BW_0$ 107-0, such $BW_0$ 107-0 was obtained from a set of customer records, which in this example are customer records 12, 123, and 543. In other words, sets of customer records may be grouped, as described below in additional detail. In this example, a last bag-of-words ($BW_n$) 107-n, for n a positive integer greater than zero, of bags-of-words 107 has another set of keywords, which in this example are color, size, density, and lines. As indicated in the remarks for $BW_n$ 107-n, such $BW_n$ 107-n was obtained from another set of customer records, which in this example are customer records 33, 44, 111, and 222. While examples of sets of three and four keywords and/or associated customer records are used, in other examples fewer or more or same numbers of keywords and/or customer records may be used in sets thereof.

Figures 1, 2, 3:
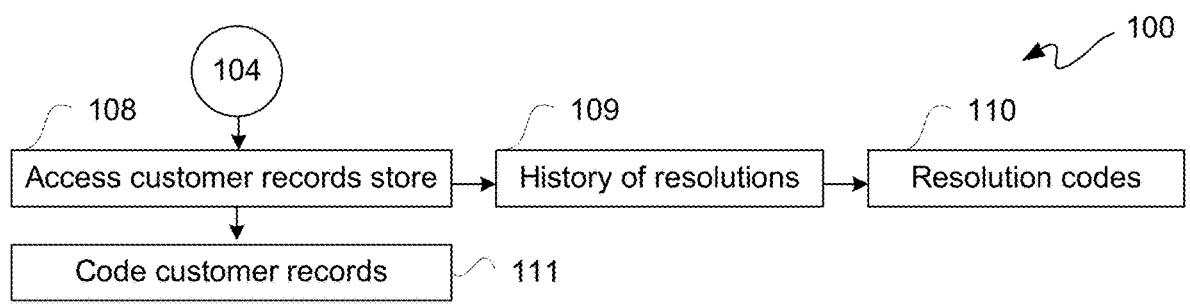

FIG. 1-3 is a flow diagram depicting a continuation of the example of customer issue process flow 100 of FIG. 1-1. At operation 108, a customer records store may be accessed. A customer records store may include a history of customer support actions and/or resolutions, namely resolutions 109. For example, such resolutions 109 may indicate whether: a customer was provided with online help; a customer requested additional maintenance work; one or more parts were ordered for replacement; and/or other customer support action. Such resolutions 109 may be associated with one or more resolution codes 110.

At operation 111, customer records may be coded with resolution codes 110, if not already done. Each customer record may have a history of one or more resolutions. For purposes of clarity by way of example and not limitation, each customer record is associated with at least one resolution code. While a one-to-one correspondence between customer records and resolution codes may be used, a one-to-one or more correspondence between customer records and resolution codes may likewise be used.

FIG. 1-4 is a pseudo code listing depicting an example of resolution codes 110 and associating or coding of customer records and resolutions codes. In this example, resolution codes 110 include an online help resolution code A1, an additional instructions by email resolution code A2, and a purchase replacement part(s) resolution code B3. These and/or other resolution codes 110 may be used in other examples.

Each customer record in a store thereof may be associated, if not already done, with a resolution code of resolution codes 110. In other words, because each customer record has a resolution history, each of such customer records can be labeled with a resolution code, such as in the examples of associations or codings 111. In this example, a customer record #12 is associated with a resolution code A1, and a customer record #33 is associated with a resolution code B3. These are just two of many possible examples.

For purposes of clarity by way of non-limiting example, suppose a customer record #12 includes a customer text message that states "the printer produces a loud noise during printing". After providing a maintenance service call, a technician replaced a feed roller on the printer, and marks customer record #12 with a resolution code A11. If the technician on such maintenance service call further cleans such printer's drum, such customer record or another customer record may be marked with a resolution code B12. If another customer record is created, it may copy the customer's text message. These are just examples of alphanumeric codes that may be used, and, of course, these or other codes may be used in other examples.

At this point it should be understood that two relatable types of relationships may be generated. One type of such relationships is an association or link between a customer's complaint record and extracted keywords, namely customer record-->bag-of-words. Another type of such relationships is an association or link between a customer's complaint record and a resolution code, namely customer record-->resolution code. These two sources of customer records may be used to provide a training dataset for machine learning. Again, a resolution code linkage to a customer complaint may be from a maintenance, a repair, an assistance, or another type of service record labeled with a link to such customer's complaint. One or more resolution codes may be recorded in a maintenance service record by a Tier-2 and/or Tier-3 support specialist associated with a successful and final resolution or fix performed to resolve a customer's complaint.

With the above general understanding borne in mind, various configurations for systems and methods for mappings are generally described below. Along those lines, a training set of data ("dataset"), namely a history of customer records and service records or resolutions, may be mapped. For example, customer records (history) may be mapped or linked to bags-of-words, which bags-of-words may be mapped or linked to resolution codes obtained from maintenance or other service records associated with such customer records. For example, a map may be generated between symptoms of a problem in a form of a bag-of-words and a successful resolution of such problem presented in a form of a resolution code. A machine learning training process may be used to build such map between problem symptoms and resolution codes. This mapped system may be used for intake of symptom inputs, such as from customers, technicians, or other users, to provide a suggested fix or fixes automatically for on-demand solutions.

FIG. 2-1 is a block-flow diagram depicting an exemplary computer-implemented mapping vector generation process 200 using a programmed computing system 250 for automatically responding to a customer request for troubleshooting a device. Mapping vector generation process 200 using a programmed computing system 250 of FIG. 2-1 is further described with simultaneous reference to FIGS. 1-1 through 2-1. Again, for purposes of clarity by way of example and not limitation, such device is assumed to be a printing device; however, another type of device or a service may be used.

At operation 201, a programmed computing system ("programmed computer system") 250 obtains a training dataset 251. Such a training dataset 251 may include a history of customer complaints and resolution records, such as previously described herein for example. Such a training dataset 251 may be obtained from at least one database 255 in memory of or accessible by such programmed computing system 250. Such at least one database 255 may further include a sentiment lexicon 257, customer descriptions 252, and service records 253, the latter two of which may be as previously described for example. Along those lines, such service records 253 may include resolution codes 110.

Generally, a training dataset 251 may be obtained from at least one database 255. Such at least one database 255 may have more than one data sources. In this example, one of such data sources is historical customer complaint records 252. These historical customer complaint records 252 may be associated with a particular printing device, a printing device family, or other product association. In this example, another one of such data sources is maintenance service records 253. Again, such maintenance service records 253 may include resolution codes 110.

At operation 202, training dataset 251 may be parsed by a natural language extraction engine 254 of programmed computer system 250 to provide extracted data 203. This parsing at operation 202 of training dataset 251 may include extracting keyword data from historical customer complaint records 252. This parsing at operation 202 of training dataset 251 may further include extracting keyword data from maintenance service records 253. At operation 204, extracted data 203 may be grouped into bags-of-words 107 with a natural language association engine 256 of programmed computer system 250.

At operation 205, bags-of-words 107 may be mapped to one or more of resolution codes 110 with a support vector machine (SVM) 260 of programmed computer system 250 to provide corresponding mapping vectors 206. With such mapping vectors 206, a customer request to troubleshoot a device may be automatically responded to, as described below in additional detail. Along those lines, mapping vectors 206 may be stored in database 255 for subsequent use for servicing a customer request, as described below in additional detail.

In text analysis, supervised machine learning processes such as Naive Bayes, Logistic Regression, and support vector machine are used in text classification tasks. While a support vector machine is described in the above example, other learning algorithms may be used in other examples. A support vector machine may be trained with bags-of-words that are not initially defined. In this example, a support vector machine allows mapping of customer complaint records to resolution codes, where such resolution codes may include services performed.

A bag-of-words model is known for feature extraction, where such features can be binary presence of terms, or term frequency, and/or weighted term frequency. Using a bag-of-words model for capturing text data, individual words in a given sentence may be counted. In a bag-of-words model, word values are maintained, but spatial layout of such words in a sentence is ignored. This creates a consistent model generally allowing any sentence to be processed at the expense of some information. A bag-of-words model discards negation on words. In order to handle negation, before creating a bag of words, a first pass to determine the grammatical structure of a sentence may be used. Negation words can then be determined and instead of such negation words being counted positively, negation words may cause word values of words respectively modified by such negative words to be adjusted down, such as by a subtraction operation for example.

For example, if sequence (order) of words can be a factor in text classification, an amount of bags-of-words can be significantly larger than a set of unique words. For example, a combination of 3 words can give factorial of 3, namely 3!=6 bags-of-words. For example, a bag-of-words {flashing, reboot, noise} can have a different classification compared to a bag-of-words {noise, reboot, flashing}.

FIG. 2-2 is a flow diagram depicting examples of operations for a parsing operation 202 of FIG. 2-1. Mapping vector generation process 200 using a programmed computing system 250 of FIG. 2-2 is further described with simultaneous reference to FIGS. 1-1 through 2-2. Again, for purposes of clarity by way of example and not limitation, such device is assumed to be a printing device; however, another type of device or a service may be used.

A parsing at operation 202 may include at operation 211 extracting keywords from training dataset 251 to provide extracted data 203, which includes extracted keywords 212. To further refine extracted data 203, at operation 213 a filtering operation may be performed on extracted keywords 212 to remove unrelated and noisy words, and at operation 214 subjectivity scores for extracted keywords 212 following negative words, such as "not" for example, may be adjusted down. Assignment of subjectivity scores may precede adjustment thereof, as described below in additional detail.

FIG. 2-3 is a flow diagram depicting examples of operations for an extracting operation 211 of FIG. 2-2. Extracting operation 211 using a programmed computing system 250 is further described with simultaneous reference to FIGS. 1-1 through 2-3. Again, for purposes of clarity by way of example and not limitation, such device is assumed to be a printing device; however, another type of device or a service may be used.

Operations 221 through 225 may be for extraction of keywords at operation 211, including scoring such keywords 212 extracted. Operations 221 through 225 may be performed by a keyword extraction engine, such as natural language extraction engine 254 of programmed computer system 250.

At operation 221, text in training dataset 251 may be segmented into sentences 222. At operation 223, each of sentences 222 may be tokenized for segmentation into a sentence set of words, as is known. At operation 224, each such set of sentence words may be normalized, as is known. At operation 225, subjectivity scores may be assigned to corresponding words in each sentence set of words to subsequently model extracted data 203 as bags-of-words 107. Assigning subjectivity scores at operation 225 may include at operation 226 looking up a subjectivity score for each word in a sentiment lexicon 257 of database 255.

FIG. 3 is the block-flow diagram of FIG. 2-1 further depicting an example of a customer request flow 300 for automatically responding to a current customer request or complaint 301 for troubleshooting a device. A customer request 301 may be received for troubleshooting a device. Again for purposes of clarity by way of example and not limitation, the example of troubleshooting a printer is used.

A printing device may or may not have an ability to report errors remotely. If an error log is not available for analysis, symptoms of a failure may be provided by a customer request, such as for example via text message, email, phone call or any online system by using natural language. A voice or text message may or may not include a detailed description of failure symptoms.

For example, a customer support representative may receive an initial message from a customer with a short description of symptoms of a failure. The message can include words like "abnormal noise" or "loud sound", and such description may be difficult to interpret in order to provide problem diagnosis and/or schedule service.

However, by using machine learning to evaluate customer messages, speed and/or accuracy for troubleshooting, and possibly resolving, device issues may be enhanced. Such algorithms as Naïve Bayes network or Support Vector Machine (SVM) use a training dataset to associate an input message with pre-defined labels or keywords. As previously described, a support vector machine allows mapping of historical records of customer complaints to resolution codes. A set of resolution codes may be limited to those defined by a manufacturer of a device, such as a printer, and each maintenance service in a set of maintenance services may be mapped to a specific resolution code of a set of resolution codes.

As previously described, input messages from customers with symptom descriptions or other descriptions of a problem with a printer in general are: parsed, keywords extracted, and bags-of-words generated. These bags-of-words are associated with a resolution code using maintenance or other service records, such as generated by onsite or offsite technicians. For example, maintenance or other service work may be for parts replacement, cleaning optical parts, or other types of maintenance or other service work. A training process using such a dataset builds a "map" that allows input of additional customer requests, such as symptom inputs for a device, and automatically provides one or more suggested fixes based on such training dataset. Along those lines, a current customer request 301 may optionally be added to training dataset 251 to continually enhance machine learning.

At operation 302, information in customer request 301 may be parsed to provide a request bag-of-words 303. Parsing of information in a current customer request 301 may be performed as previously described.

At operation 304, at least one mapping vector 206 having a most likely fit to request bag-of-words 303 may be selected to provide at least one most likely resolution code. Along those lines, though there may be a most likely fit or a tie for most likely fits, a set of one or more mapping vectors of mapping vectors 206 may be selected or determined to set up a process of elimination for a user to perform for diagnosis of a problem and then to effect a fix or other solution for correcting such problem. In this example, support vector machine 260 is configured to select a most likely fit of mapping vectors 206 stored in database 255 with respect to request bag-of-words 303.

From operation 304, one or more resolution codes 305 associated with such determined one or more of mapping vectors obtained at operation 304 may be provided at operation 306 to a customer or user initiating such current customer request or complaint 301. For example, these one or more resolution codes 305 may be communicated by text, email, online web app, or other manner to a customer or other user of a support system.

At operation 307, a maintenance service resolution following such one or more resolution codes 305 may be applied to resolve a customer request 301. In another example, such one or more resolution codes 305 may be provided to a support program of a printing device to automatically perform a fix or isolate a fix at operation 307.

Figures 1, 2, 3, 4:
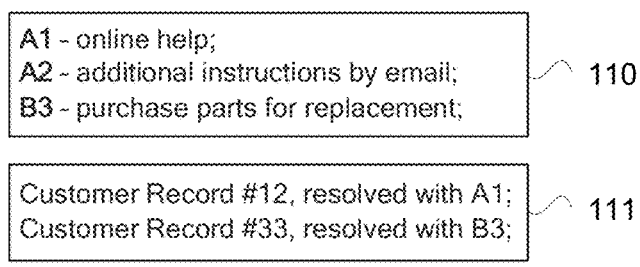
Figures 1, 2:
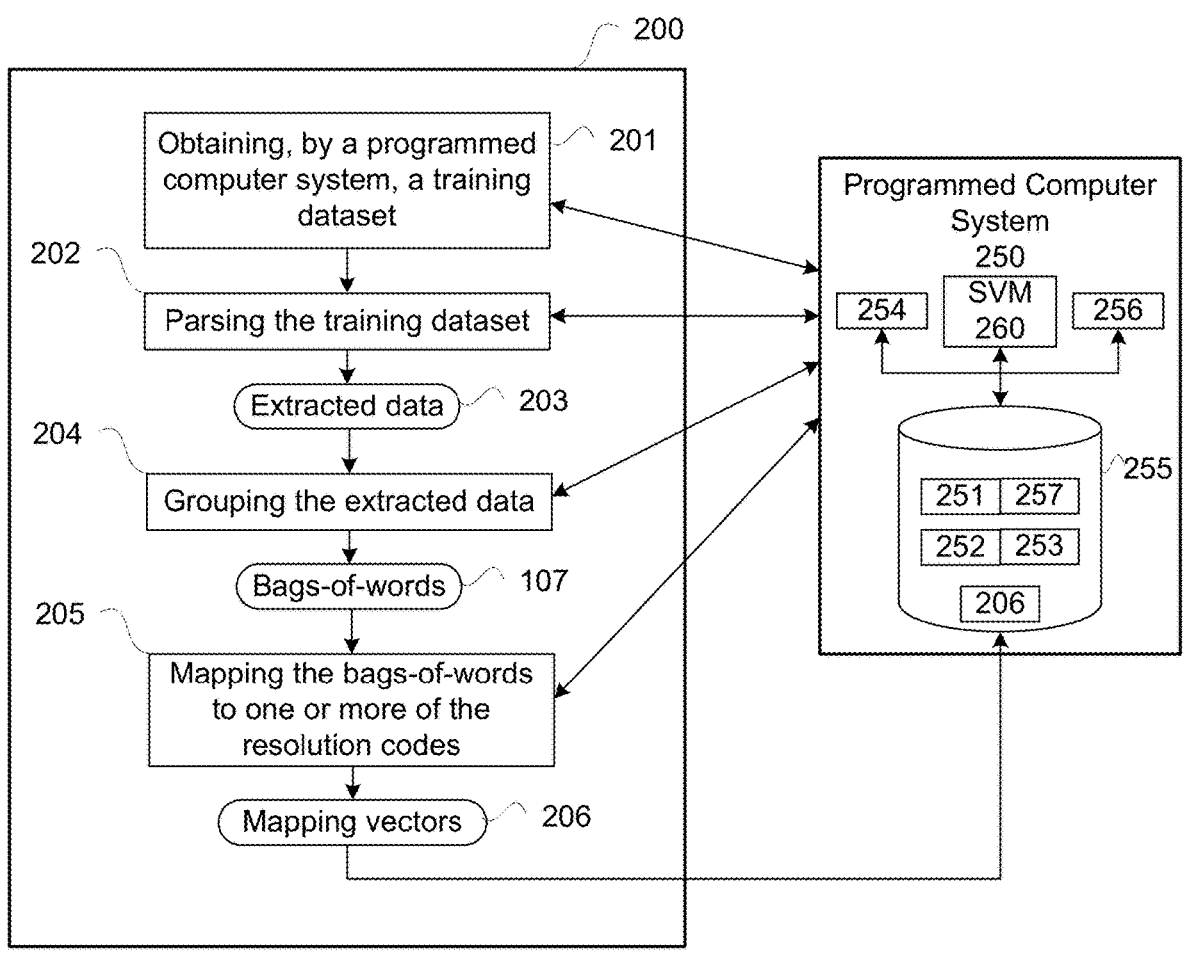
Figure 2:
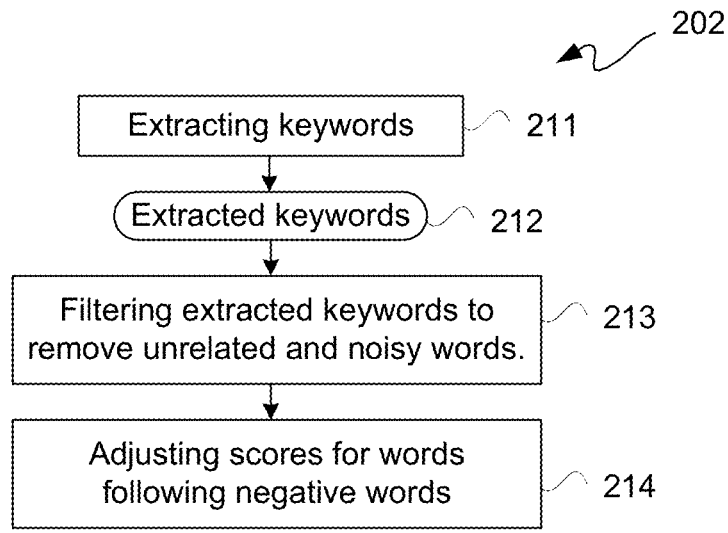
Figures 2, 3:
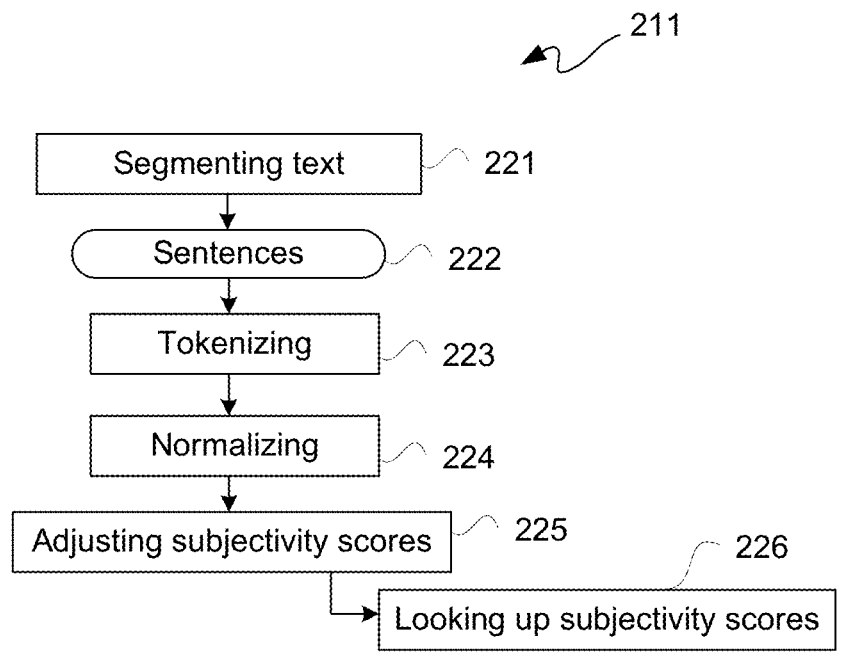
Figure 3:
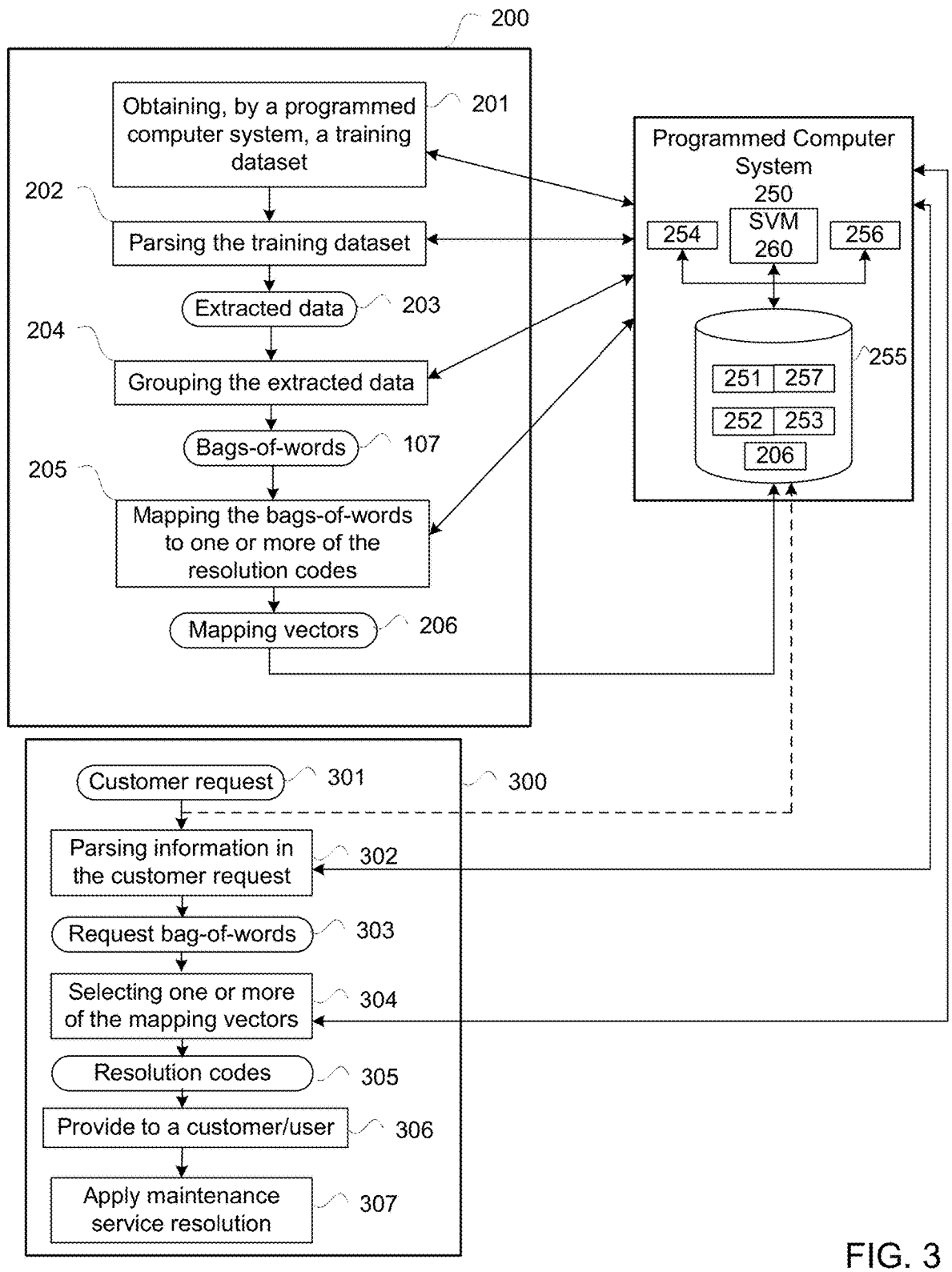

FIG. 4 is a block diagram depicting an example of fields for a service record 400. A service record 400 may include one or more fields, including: a device model field ("device model") 401, a service description field ("service description") 402, and a resolution code field ("resolution code") 403. Device model 401 may be for a printing device as in this example, or another electronic device. Resolution code 403 may be one of resolution codes 110 for such a device model 401. Examples of a service description 402 for a printer may include "replaced a feeder roller" or "cleaned a drum". A resolution code may be in the form of an alphanumeric label or number. Resolution codes conventionally are defined and described in maintenance manuals provided by a manufacturer for one or more device models. Accordingly, reported symptoms in a customer complaint or request may be associated with a resolution code, as a technician inputs a resolution code for each fix. A Tier-2 or Tier-3 support specialist may provide a resolution code for a final solution to a maintenance or service issue, namely a final resolution code.

Such a service record 400 may further include one or more other fields, including: a customer name field 404, a technician name field 405, a request number field 406, and a date of service field 407. A technician name field 405 may be for a name of a Tier-2 or Tier-3 specialist. A request number for a request number field 406 may be generated in response to, and thus associated with, a customer complaint or other customer request, such as for example a current customer request 301 of FIG. 3 for example.

Figures 4, 5:
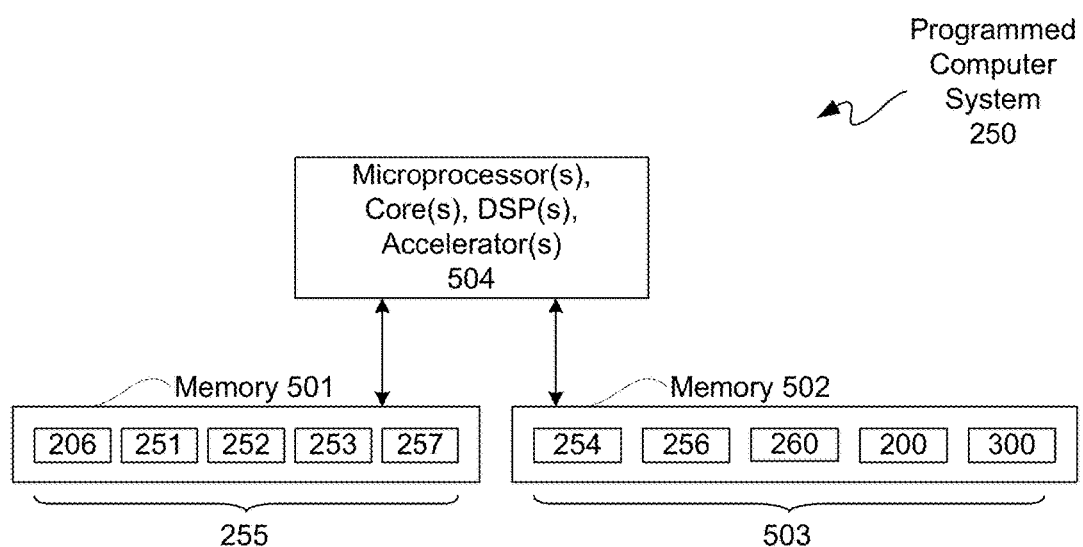

FIG. 5 is a block diagram depicting an example of a programmed computer system 250. Programmed computer system 250 may be computer-implemented system for automatically responding to a customer request for troubleshooting a device, as previously described herein and further described with simultaneous reference to FIGS. 1-1 through 5.

In programmed computer system 250, memories 501 and 502 may be configured to store program code 503 and may include at least one database ("databases") 255. Such databases 255 may store in memory 501 mapping vectors 206, training dataset 251, customer descriptions 252, service records 253, and sentiment lexicon 257. Such program code 503 may include or be for natural language extraction engine 254, natural language association engine 256, support vector machine 260, mapping vector generation process 200, and customer request flow 300. Memories 501 and 502 may be same and/or different types of memories, and may be local and/or remote with respect to at least one processor ("processors") 504 of programmed computer system 250.

In this example, processors 504 may include one or more microprocessors, processor cores, digital signal processors (DSPs), and/or accelerator(s). An accelerator may be circuitry instantiated in field programmable gate array circuitry for one or more items of program code 503. Along those lines, processors 504 may be configured in response to the program code 503 to execute machine executable instructions to include operations previously described herein and not repeated for purposes of clarity and not limitation.

Figure 6:
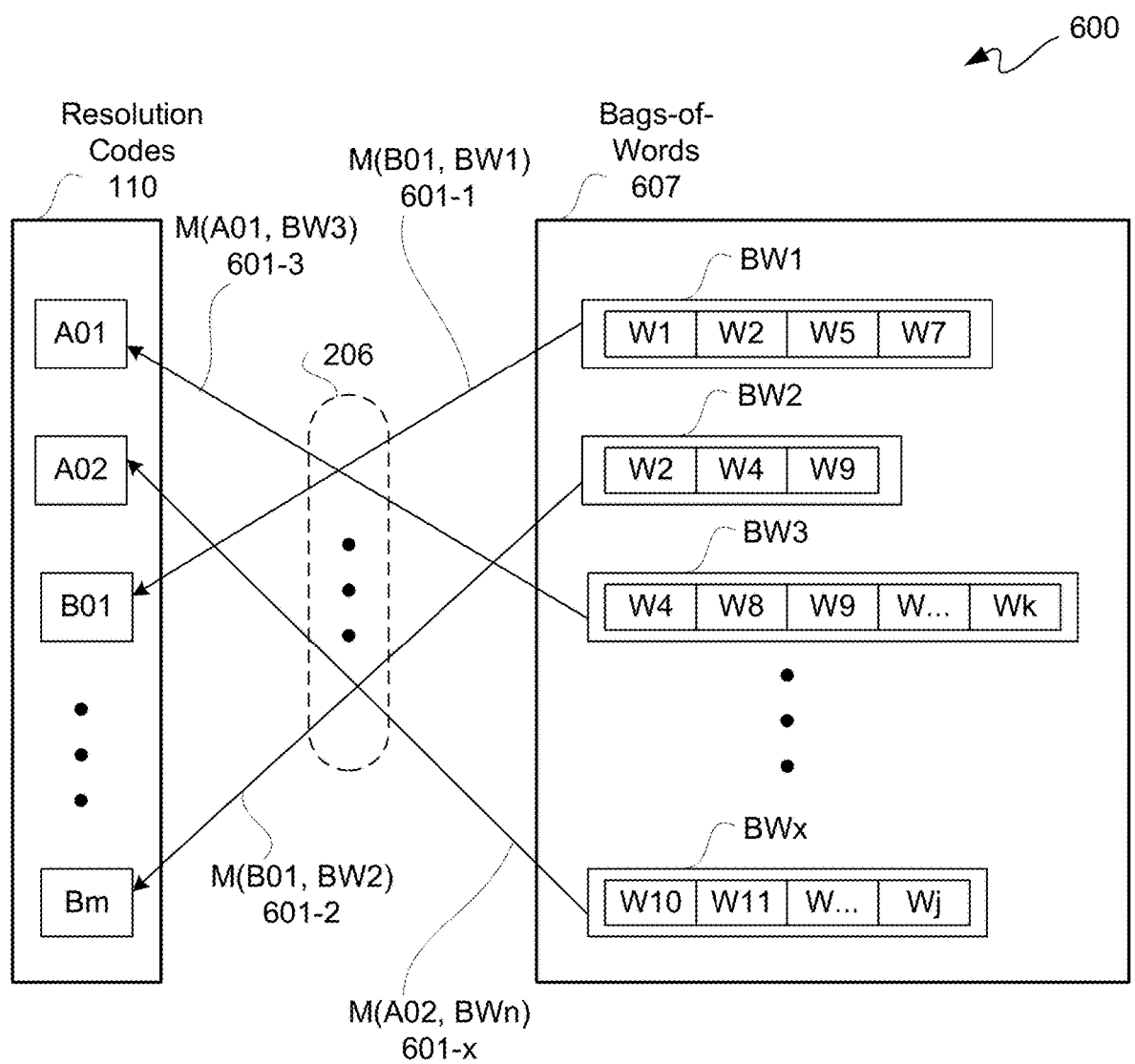
FIG. 6 is a block diagram depicting an example of a support vector machine mapping flow.

FIG. 6 is a block diagram depicting an example of a support vector machine mapping flow 600. Mapping flow 600 is further described with simultaneous reference to FIGS. 1-1 through 6.

Support vector machine 260 may be configured to map bags-of-words 107 to resolution codes 110. Such mapping may be used to generate a set of mapping vectors 206, as previously described.

For customer inputs, such customer inputs may be parsed into corresponding input bags-of-words 607. In support vector machine 260, an input bag-of-words, such as for example BW1, of input bags-of-words 607 may be evaluated against all mapping vectors 206. Most values may calculate out as less than −1 in such mapping. Any and all values greater than 1 may be presented as possible solutions and positively map such input bag-of-words BW1 to a resolution code of resolutions codes 110. In this example, input bag-of-words BW1 is mapped to resolution code B01 by a support or request vector M (B01, BW1) 601-1 of mapping vectors 206, as a most likely fit for example. Correspondingly, other input bags-of-words BW2, BW3, . . . , BWx are mapped to resolution codes Bm, A01, . . . , A02, respectively, by support or request vectors 601-2, 601-3, . . . , 601-x, respectively, of mapping vectors 206. In this example, input bags-of-words 607 are from customer requests. In this example, BW1 through BWx, for x a positive integer greater than three, have different sets of words W, where j and k are different positive integers greater than 9 and 11, respectively.

Accordingly, speed and/or accuracy of resolving customer support issues may be enhanced by implementing a support vector machine 260 as described herein. Such support vector machine may be implemented in a printer or other electronic device or be provided as a cloud-based service. Access to such support vector machine 260 may be from a web-based application run on a proxy device, such as a mobile phone, tablet, notebook computer, desktop computer, or other communications device, or may be run directly on a printer or other device for which support is sought. With respect to the latter, after mapping vectors 206 are generated and stored, processing tasks for a support vector machine 260 are reduced for direct implementation on a device for which support is sought.

Figure 7:
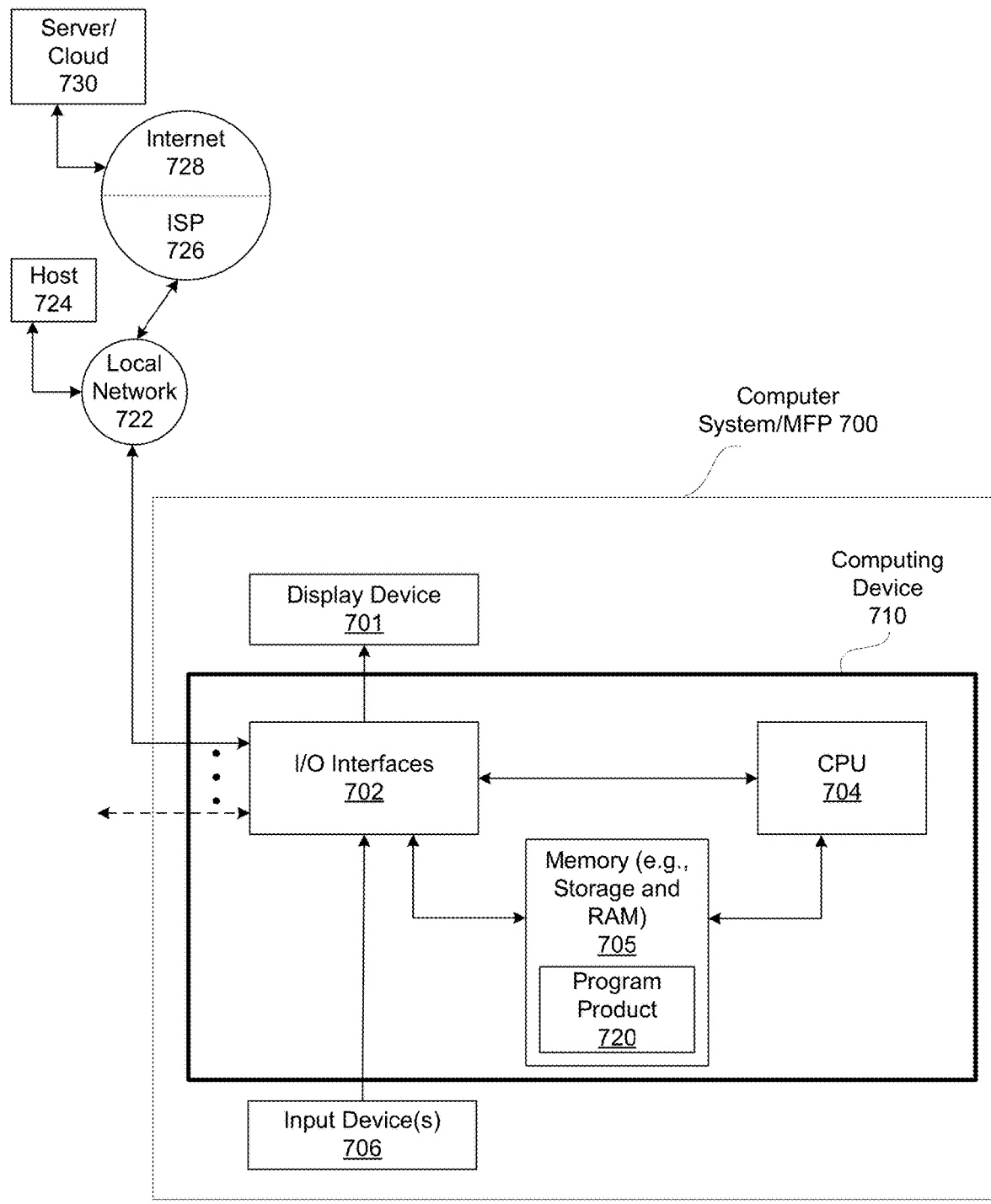
FIG. 7 is a block diagram depicting an example computer system upon which one or more aspects described herein may be implemented.

Because one or more examples include use of a programmed computer system, where such programmed computer system may include a communications server or a cloud-based computing system, FIG. 7 is a block diagram depicting an example computer system 700 upon which one or more aspects described herein may be implemented. Along those lines, a multi-function printer (MFP), such as MFP 700, in effect may be a computer system, where a panel thereof, is effectively a display device 701. Along those lines, an MFP may be configured for automatic diagnosis of a problem therewith responsive to input by a user describing problem symptoms.

More generally, such a computer system/MFP 700 may include a programmed computing device 710 coupled to a display device 701, such as Liquid Crystal Displays ("LCDs"), Light Emitting Diode ("LED") displays, and to one or more input devices 706, such as a keyboard and a cursor pointing device. Display 701 may be a touch screen display. Computer system/MFP 700 by itself or networked with one or more other computer systems may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. I/O interface 702 may include interface circuitry adapted to receive and transmit data, such as data files and the like.

Programmed computing device 710 may optionally include one or more peripheral cards (not shown). An example of a daughter or peripheral card may include a network interface card ("NIC"), a display interface card, and a Universal Serial Bus ("USB") interface card, among other known circuits.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing all or portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

For example, program product 720 may include a support vector machine 260, a natural language keyword extraction engine 254, and a predetermined set of mapping vectors 206. Such natural language keyword extraction engine 254 may parse a customer request for support vector machine 260 to find a set of likely vectors of mapping vectors 206 for troubleshooting an electronic device including program product 720.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which may include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system/MFP 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system/MFP 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system/MFP 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are example forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system/MFP 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system/MFP 700 may obtain application code in the form of a carrier wave.

Figure 8:
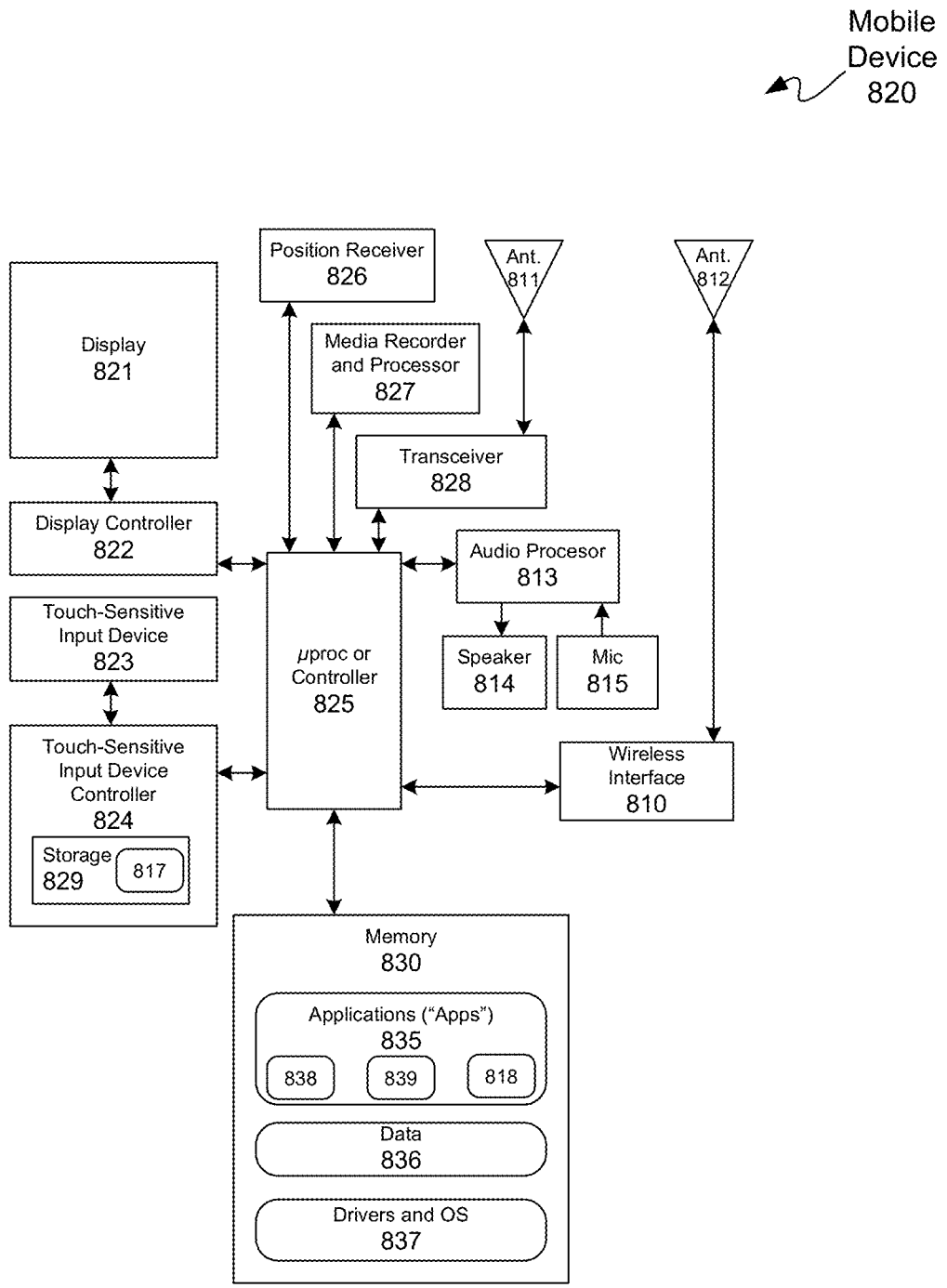
FIG. 8 is block diagram depicting an exemplary portable communication device ("mobile device").

Because one or more examples involve a mobile device for a client device for inputting a customer request, such as via a text message or email for example, FIG. 8 is block diagram depicting an exemplary portable communication device ("mobile device") 820. Mobile device 820 may include a wireless interface 810, an antenna 811, an antenna 812, an audio processor 813, a speaker 814, and a microphone ("mic") 815, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 820. Microprocessor or microcontroller 825 may include a commercially available or custom microprocessor or microcontroller.

Memory 830 may be interconnected for communication with microprocessor or microcontroller 825 for storing programs and data used by mobile device 820. Memory 830 generally represents an overall hierarchy of memory devices containing software and data used to implement functions of mobile device 820.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 820 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. Data may include application program data.

I/O device drivers may include software routines accessed through microprocessor or microcontroller 825 or by an OS stored in memory 830. Apps, to communicate with devices such as the touch-sensitive input device 823 and keys and other user interface objects adaptively displayed on a display 821, may use one or more of such drivers. For example, a driver may be used for communication from keys of a user interface displayed on display 821 associated with touch zones of touch sensitive input device 823. Moreover, drivers may be used for other actual or virtual input/output ports of mobile device 820.

Mobile device 820, such as a mobile or cell phone, includes a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor. For example, touch-sensitive input device may be a haptic input device, a pressure-sensitive input device, or some other touch-sensitive input device.

Along those lines, touching activity input via touch-sensitive input device 823 may be communicated to touch-sensitive input device controller 824. Touch-sensitive input device controller 824 may optionally include local storage 829 for storing locations or touch zones or other sensed information 817 associated with touching activity input. In another example, sensed information 817 may be stored in memory 830.

Touch-sensitive input device controller 824 may be programmed with a driver or application program interface ("API") for output of sensed information 817 to an app 818 of apps 835. In another example, app 818 may be incorporated into OS 837.

Microprocessor or microcontroller 825 may be programmed to interface directly via touch-sensitive input device 823 or through touch-sensitive input device controller 824. Microprocessor or microcontroller 825 may be programmed or otherwise configured to interface with one or more other interface device(s) of mobile device 820. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 820 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836.

Mobile device 820 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones ("mic") 815, for projecting and receiving sound, including without limitation recording sound, via mobile device 820. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 820 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output corresponding to audio data may be transferred from mobile device 820 via an adapter to another mobile radio terminal, a computer, or another electronic device. In another example, wireless interface 810 may be for communication within a cellular network or another Wireless Wide-Area Network ("WWAN").

Figure 9:
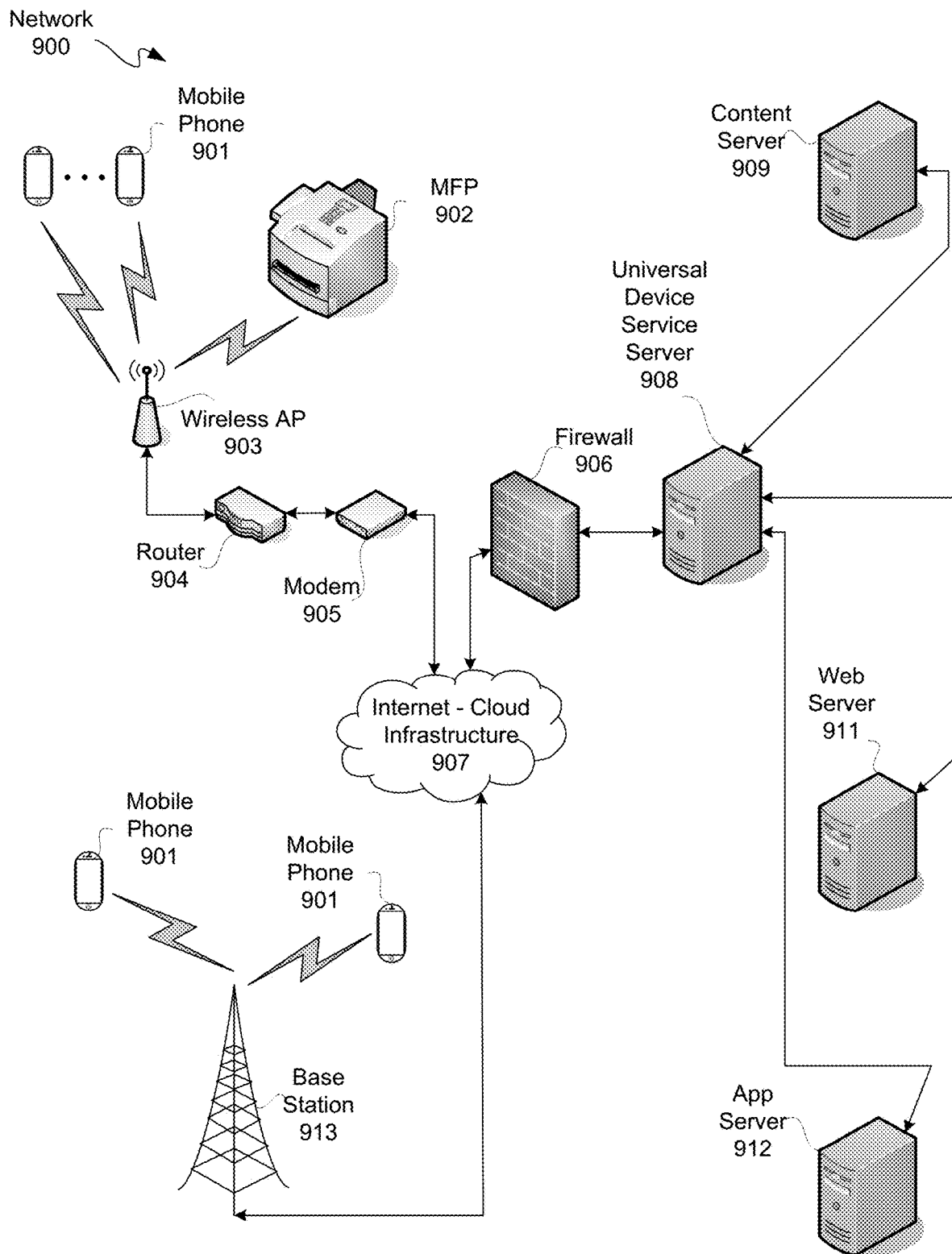
FIG. 9 is a pictorial diagram depicting an exemplary network.

Because one or more examples involve a network or networks, FIG. 9 is a pictorial diagram depicting an exemplary network 900. Network 900 may include one or more mobile phones 901 in wireless communication with wireless access point ("AP") 903 and one or more mobile phones 901 in communication with a base station 913.

A MFP 902 may be in wireless communication with wireless AP 903. Wireless AP 903 may be connected for communication with a router 904, which in turn may be connected to a modem 905. Modem 905 and base station 913 may be in communication with the Internet-Cloud infrastructure 907.

A firewall 906 may be in communication with the Internet-Cloud infrastructure 907. Firewall 906 may be in communication with a universal device service server 908. Universal device service server 908 may be in communication with a content server 909, a web server 911, and/or an app server 912.

Accordingly, known details regarding networks are not described in unnecessary detail for purposes of clarity and not limitation.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A computer-implemented method for automatically responding for troubleshooting a printing device, the computer-implemented method comprising:
 obtaining, by a programmed computer system, a training dataset;

wherein the training dataset obtained from at least one database includes a plurality of data sources;

wherein the plurality of data sources include a first data source comprising historical customer complaint records and a second data source comprising maintenance service records;

wherein the maintenance service records include resolution codes;

parsing the training dataset by a natural language extraction engine of the programmed computer system to provide extracted data, the parsing of the training dataset comprising extracting keyword data from the historical customer complaint records;

grouping the extracted data into bags-of-words with a natural language association engine;

mapping the bags-of-words to one or more of the resolution codes with a support vector machine to provide corresponding mapping vectors;

receiving a current customer complaint record;

parsing information in the current customer complaint record to provide a request bag-of-words;

determining one or more of the mapping vectors having one or more most likely fits to the request bag-of-words; and providing one or more of the resolution codes associated with the one or more of the mapping vectors.

2. The computer-implemented method according to claim 1, further comprising applying a maintenance service resolution corresponding to the one or more of the resolution codes.

3. The computer-implemented method according to claim 1, wherein the resolution codes are predetermined by a manufacture of the printing device.

4. The computer-implemented method according to claim 1, wherein the resolution codes recorded in the maintenance service records are added by a Tier-2 or Tier-3 specialist after resolutions corresponding to the maintenance service records.

5. The computer-implemented method according to claim 1, wherein the parsing of the training dataset comprises filtering the extracted data to remove unrelated and noisy words.

6. The computer-implemented method according to claim 1, wherein the parsing of the training dataset comprises adjusting scores for words following negative words in the extracted data.

7. The computer-implemented method according to claim 1, wherein the parsing of the training dataset comprises:
segmenting text in the training dataset into sentences;
tokenizing each of the sentences for segmentation into a set of words;
normalizing the set of words;
assigning subjectivity scores to corresponding words in the set of words to model the extracted data as a bag-of-words; and
the assigning comprises looking up a subjectivity score for each word in the set of words in a sentiment lexicon.

8. The computer-implemented method according to claim 1, wherein a service record of the service records includes a device model field for the printing device, a service description field, and a resolution code field for a resolution code of the resolution codes for the device model.

9. The computer-implemented method according to claim 8, wherein the service record further includes a service date field and a Tier-2 or Tier-3 specialist's name field for a Tier-2 or Tier-3 specialist providing a final resolution code.

10. The computer-implemented method according to claim 8, wherein customer descriptions of the historical customer complaint records include symptom descriptions obtained from text messages and email messages.

11. A computer-implemented system for automatically responding for troubleshooting a printing device, the computer-implemented system comprising:
memories configured to store program code and at least one database;
at least one processor of a processor system configured in response to the program code to execute machine executable instructions to:
obtain the at least one database as a training dataset;
wherein the training dataset obtained from the at least one database includes a plurality of data sources;
wherein the plurality of data sources include a first data source comprising historical customer complaint records and a second data source comprising maintenance service records;
wherein the maintenance service records include resolution codes;
parse the training dataset by a natural language extraction engine of the processor system to provide extracted data including extracting keyword data from the historical customer complaint records;
group the extracted data into bags-of-words with a natural language association engine of the processor system;
map the bags-of-words to one or more of the resolution codes with a support vector machine of the processor system to provide corresponding mapping vectors;
receive a current customer complaint record;
parse information in the current customer complaint record to provide a request bag-of-words;
determine one or more of the mapping vectors having one or more most likely fits to the request bag-of-words; and
provide one or more of the resolution codes associated with the one or more of the mapping vectors.

12. The computer-implemented system according to claim 11, wherein the at least one processor of the processor system is configured in response to the program code to execute machine executable instructions to apply a maintenance service resolution corresponding to the one or more of the resolution codes.

13. The computer-implemented system according to claim 11, wherein the resolution codes are predetermined by a manufacture of the printing device.

14. The computer-implemented system according to claim 11, wherein the resolution codes recorded in the maintenance service records are added by a Tier-2 or Tier-3 specialist after resolutions corresponding to the maintenance service records.

15. The computer-implemented system according to claim 11, wherein the at least one processor is configured in response to the program code to execute the machine executable instructions to filter the extracted data to remove unrelated and noisy words to parse the training dataset.

16. The computer-implemented system according to claim 11, wherein the at least one processor is configured in response to the program code to execute the machine executable instructions to adjust scores for words following negative words in the extracted data to parse the training dataset.

17. The computer-implemented system according to claim 11, wherein, to parse the training dataset, the at least one processor is configured in response to the program code to execute the machine executable instructions to:

segment text in the training dataset into sentences;

tokenize each of the sentences for segmentation into a set of words;

normalize the set of words;

assign subjectivity scores to corresponding words in the set of words to model the extracted data as a bag-of-words; and to assign the subjectivity scores, the at least one processor is configured in response to the program code to execute the machine executable instructions to look up a subjectivity score for each word in the set of words in a sentiment lexicon stored in the memories.

18. The computer-implemented system according to claim 11, wherein a service record of the service records includes a device model field for the printing device, a service description field, and a resolution code field for a resolution code of the resolution codes for the device model.

19. The computer-implemented system according to claim 18, wherein the service record further includes a service date field and a Tier-2 or Tier-3 specialist's name field.

20. The computer-implemented system according to claim 18, wherein customer descriptions of the historical customer complaint records include symptom descriptions obtained from text messages and email messages.

* * * * *